United States Patent Office 2,948,708
Patented Aug. 9, 1960

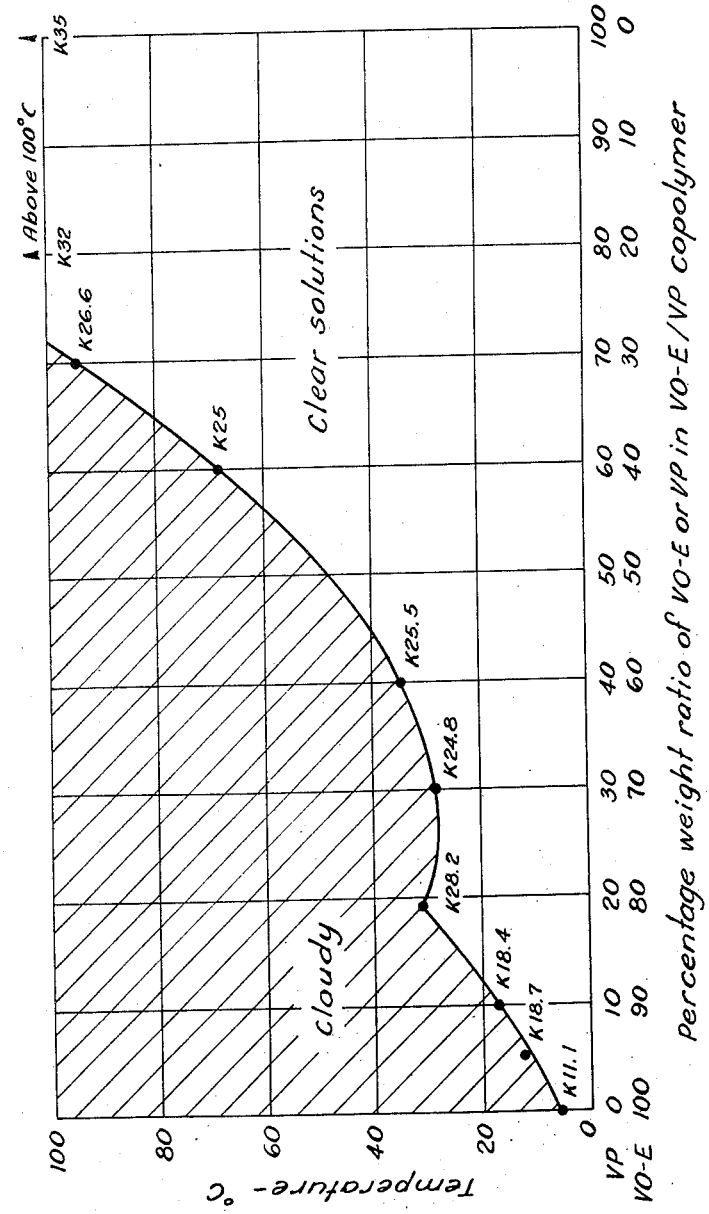

2,948,708

WATER-SOLUBLE COPOLYMERS OF RING SUBSTITUTED N-VINYL-2-OXAZOLIDINONE

Wilhelm E. Walles and William F. Tousignant, Midland, Mich., assignors to The Dow Chemical Company, Midland, Mich., a corporation of Delaware Filed Apr. 3, 1958, Ser. No. 726,256

6 Claims. (Cl. 260—77.5)

The present invention resides in the general field of organic chemistry and is more particularly pertinent to the polymer art. It has specific reference to certain water-soluble copolymers of N-vinyl-5-ethyl-2-oxazolidinone (hereinafter referred to as VO–E and its closely related isomers with various N-vinyl cyclic amides including in particular, certain of the N-vinyl lactams and N-vinyl-3-morpholinones and certain other closely related N-heterocyclic vinyl monomers.

Poly-N-vinyl-5-ethyl-2-oxazolidinone (PVO–E) is a polymer of recent origin having many highly advantageous and remarkable properties. By way of illustration, PVO–E has unusual capacity for and the pronounced capability of attracting and accepting many of a wide variety of dyestuffs, including vat, acid, acetate, direct, naphthol and sulfur dyes. This property makes the polymer significantly attractive as a dye-assisting adjuvant for many synthetic textile fibers that are normally difficult, if not impossible, to dye and in which the PVO–E may be incorporated. It may also be utilized with benefit as a dye-stripping agent for various textile materials and, amongst many other applications, may be employed with advantage in hair-setting compositions.

Although, within certain relatively severe limits, PVO–E will dissolve in water, its solubility in aqueous media is not at all general or without serious restriction. As a matter of fact (for substantially all practical intents and purposes), PVO–E may be characterized as being a water-insoluble polymer. Thus, the high polymer forms of PVO–E are generally insoluble in water at temperatures above about 3° C. For example, PVO–E having a Fikentscher K-value of about 20 will not dissolve to any appreciable extent in water that is at room temperature or higher. While the polymer can be dissolved in ice water, it comes out of solution by means of thermal coagulation (i.e., exhibits a "cloud point") upon warming of the cold solution to only 3–4° C. At temperatures that are higher than the cloud point of the PVO–E in such cold aqueous solutions, the polymer generally separates from the solvent vehicle in the form of a sticky, frequently difficult-to-handle mass. As a consequence, it is generally necessary when solutions of PVO–E are desired to employ alcoholic (i.e., methanol, ethanol, propanol, etc.) or other organic solvent vehicles. Closely analogous phenomena are observed with poly-N-vinyl-4-ethyl-2-oxazolidinone as well as with poly-N-vinyl-4,5-dimethyl-2-oxazolidinone.

For many applications, the indicated characteristics are not of material consequence. In certain instances, however, they may be of decided disadvantage. Thus, one of the attractive utilities of PVO–E is as a dye-receptor for acrylonitrile polymer compositions. One highly advantageous technique for providing such compositions, particularly when polyacrylonitrile based fiber products are involved, is to apply or impregnate the PVO–E from a solution or dispersion of relatively low polymer solids content to a shaped acrylonitrile polymer article that is in an aquagel condition. Thus, an acrylonitrile polymer filamentary article that, pursuant to a well known procedure, has been salt-spun from an aqueous saline spinning solution may be conveniently passed, after its coagulation and while it is still in an aquagel or highly hydrated condition, through a bath containing the dissolved or dispersed PVO–E in order to impregnate the filament with the dye-assisting polymer adjuvant. It is generally preferred to use aqueous impregnating baths for such purpose and is sometimes desirable in such an operation to employ a hot impregnating bath. However, as is evident, such condition causes precipitation of the polymer due to its inverse solubility characteristics in other than ice-water aqueous solvents. This may tend to complicate the impregnating operation or require utilization of other than aqueous solvents which, generally, are much less expedient for such an operation.

Likewise, in dye-stripping processes, better results are oftentimes achieved when a hot or boiling aqueous treating bath is employed. In addition, hair-setting formulations are oftentimes deemed to be of greater advantage and more widespread utility when constituted with a water-containing alcoholic vehicle.

It would be an advantage, and it is the chief aim and concern of the present invention, to provide VO–E polymers having dye-receiving and other properties and characteristics commensurate with those of PVO–E while having a vastly greater and more extended range of water-solubility, even under conditions of considerably higher temperature, while retaining good solubility in alcoholic media. The inherent benefit of such more completely soluble polymeric compositions for use in alcohol or hot aqueous solutions or both, is manifest from the foregoing description and is further evident in the ensuing specification.

According to the present invention, a much more thoroughly water-soluble VO–E polymer composition that is not materially afflicted or hampered by impractically low temperature inverse solubility and cloud point effects in aqueous solution is comprised of a copolymer of the general structure:

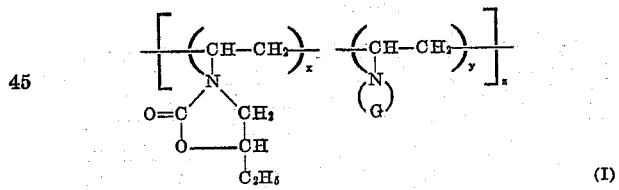

(I)

wherein G is a nitrogen attached, bivalent cyclizing group of the formulae:

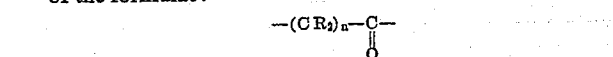

and

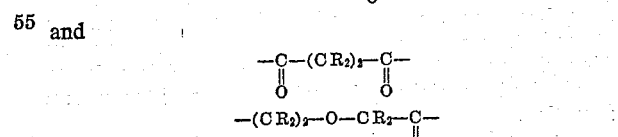

in which R is hydrogen, methyl or ethyl and $n$ is an integer from 3 to 5; $z$ is equal to the sum of $x$ plus $y$ and the value of either $x$ or $y$ (or their relative proportion) is such that at least 1 weight percent of the copolymer consists of the polymerized VO–E monomer. Thus, as is apparent, the comonomers may be an N-vinyl-2-pyrrolidone, an N-vinyl-2-piperidone (including valerolactams), an N-vinyl-2-caprolactam, an N-vinyl-succinimide, an N-vinyl-3-morpholinone, or mixtures thereof.

Most advantageously, the N-vinyl heterocyclic comonomers employed are those which are not alkyl ring substituted, i.e., in which all of the R substituents in the above-indicated G groups are hydrogen. Thus, the comonomers are most beneficially selected from at least one member of the group consisting of N-vinyl-2-pyrrolidone (also known as N-vinyl-2-pyrrolidinone), N-vinyl-2-piperidone, N-vinyl-2-caprolactam, N-vinyl-succinimide and N-vinyl-3-morpholinone which, respectively, are of the structures:

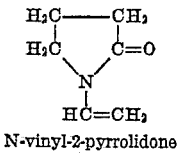
N-vinyl-2-pyrrolidone (II)

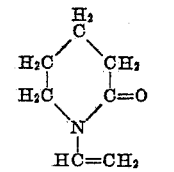
N-vinyl-2-piperidone (III)

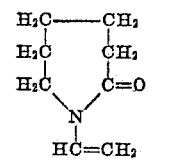
N-vinyl-2-caprolactam (IV)

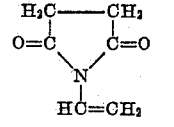
N-vinyl-succinimide (V)

and

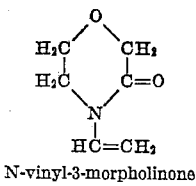
N-vinyl-3-morpholinone (VI)

As has been indicated, the copolymers of the present invention may contain from about 1 to 99 weight percent of VO–E in the polymer molecule. As little as 1 percent or so of one of the indicated comonomers with VO–E has a marked beneficial effect on the cloud point of the copolymer product. More highly pronounced effects are noted when the VO–E content is between about 5–10 and 90–95 weight percent. Advantageously, however, the VO–E content of the copolymer is less than about 40 weight percent and, with even greater benefit for many purposes, may be between about 10 and 30 weight percent, based on the total weight of the copolymer. In many instances it may be most desirable to copolymerize N-vinyl-2-pyrrolidone (VP) with the VO–E in order to obtain the beneficial copolymeric products of the present invention.

The copolymers of the present invention have excellent water-solubility with cloud points in aqueous solution that generally are considerably higher than those of PVO–E. Aqueous solutions containing as much as 40–50 percent by weight of the dissolved copolymer at room temperatures can easily be prepared. And, generally speaking, the cloud points of copolymers containing as much as 50 weight percent of VO–M are at least about 50° C., whereas copolymers containing 60–70 or more weight percent of the N-heterocyclic comonomer, especially VP, are substantially, if not entirely, free from clouding effects, even near or at the boil. Likewise, the copolymers usually have substantially complete alcohol solubility, at least commensurate with the solubility in alcohol of PVO–E.

The densities of the copolymeric products of the present invention, which are usually obtainable in the form of normally solid, amorphous (i.e., non-crystalline), free-flowing, white or light-colored, hygroscopic powders, are generally intermediate between those of the individual homopolymers of the separate comonomeric constituents. To afford illustration of this, the VO–E/VP copolymers ordinarily have densities between about 1.212 and 1.188 grams per cubic centimeter (which are the densities of poly-N-vinyl-2-pyrrolidone (PVP) and PVO–E, respectively). The dye-receptivity of all of the copolymeric products of the invention is commensurate with that of either PVP or PVO–E.

The copolymeric products can be prepared in the conventional manner by polymerization in mass (oftentimes referred to as bulk polymerization) as well as polymerization, at practically any level of concentration, in alcoholic or other solution or in emulsion or other dispersion in water and other liquids with which the particular monomers being copolymerized are either not soluble or soluble or only partially soluble. It is ordinarily beneficial for the polymerization to be conducted at a temperature between about 50° and 100° C., although this may vary with the particular catalysts used and the type of reaction being conducted. Suitable catalysts or initiators for the copolymerization include the azo catalysts, such as α,α′-azobisisobutyronitrile, peroxygen catalysts, such as potassium persulfate, benzoyl peroxide, lauroyl peroxide, hydrogen peroxide and the like, and irradiation under the influence of high energy fields. The latter catalyzation may include the various actinic radiations, including such diverse forms of catalysis as ultraviolet, X-ray and gamma radiations, as well as radiations from radioactive materials and high energy electron beams generated from linear accelerators, resonant transformers and the like. The copolymers may advantageously be prepared as high polymers having molecular weights, for example, in the range from 5 or 10 to several hundred thousand (as determinable from Fikentscher K-values of about 5–10 or more to as high as 75 to 100 or so). The general correspondence of K-value of the copolymer products to molecular weight, which is a non-linear relationship, is about as follows:

| Fikentscher K-value of VO-E copolymer | Molecular Weight |
| --- | --- |
| 20 | 22,000 |
| 30 | 40,000 |
| 40 | 70,000 |
| 50 | 120,000 |
| 60 | 180,000 |
| 90 | 360,000 |

As mentioned in the foregoing, the copolymer products may be employed with great benefit as dye-assisting adjuvants or dye-receptors for synthetic textile fibers and other shaped articles of normally difficult to dye synthetic polymers in which they may be incorporated, particularly those of the fiber forming acrylonitrile polymers including polyacrylonitrile. They are also very useful as dye-stripping agents for textiles, in various hair setting formulations and preparations and for the precipitation of haze-inducing constituents (such as tannins, pectins, etc.) from beer, wine and other alcoholic and non-alcoholic beverages to free them from "chill-hazing" phenomena.

The invention is further illustrated in and by the following examples, wherein all parts and percentages are to be taken by weight.

*Example A*

Into a one liter resin flask there was charged 20 grams of pure VP (M.W. 111); 80 grams of essentially (99.3 percent) pure VO–E (M.W. 128); 1 gram of α,α'-azo-bisisobutyronitrile; and 500 grams of absolute ethanol. The contents of the flask were stirred constantly and heated under reflux (78° C.) for ten hours. After this time, the reaction was terminated. At least 98 percent conversion of monomers to copolymer product was achieved. The resulting solution was clear, colorless and syrupy. The VO–E/VP copolymeric product, which contained the respective polymerized monomers in about an 80/20 percent ratio, was isolated by slowly pouring the reaction mass into about 2 liters of dry diethyl ether, whereupon the copolymer precipitated as a white powder having a density of about 1.193 grams per cubic centimeter (after having been dried in vacuum for purification). Its K-value was about 28.2.

The VO–E/VP copolymer product had molecular weight of about 40,000 and coagulation (i.e., "cloud") point in water of about 31° C. It was readily soluble in water (at any temperature beneath about 31° C.) and such alcohols as methanol, ethanol, propanol, etc.

The foregoing general procedure was duplicated several times, using varied proportions of the monomeric ingredients, to obtain VO–E/VP copolymer products containing from 1 to 99 percent of polymerized VO–E. Similar results may also be obtained when the foregoing procedure is essentially duplicated, excepting to replace the VP monomer with N-vinyl-2-piperidone, N-vinyl-2-caprolactam, N-vinyl-succinimide, N-vinyl-3-morpholinone or mixtures thereof, or with mixtures of all, or any, of the last mentioned monomers with VP.

*Example B*

A series of physical mixtures (or polymer blends) of PVO–E and PVP was prepared using homopolymers having K-values between about 20 and 30. When attempted to be dissolved in water at room temperature to obtain solutions having about 5 percent total dissolved solids, the resulting compositions showed the general insolubility and characteristic cloud point of PVO–E above about 3° C. Thus, only the PVP dissolved from the physical mixture until the composition was chilled to below 3° C., whereupon the PVO–E also went into the aqueous solution.

In contrast, a series of VO–E/VP copolymers were prepared containing varying proportions of VO–M polymerized in the polymer molecule. When the copolymer products were dissolved in water to make 5 percent solutions and heated, it was observed that the cloud point underwent a sharp rise with increasing amounts of VP in the copolymer. Thus, in a copolymer containing 5 percent VP, the cloud point was about 12° C.; with 10 percent VP it was about 17° C.; with about 20 percent VP it was about 30° C.; with 60 percent VP it was 95° C. Copolymers containing more than about 70–75 percent VP were found to have no cloud point, even at the boil. The aqueous solutions of the copolymer were found to become frothy upon mechanical agitation, indicating the properties of the copolymer as a surface active agent. The results of these data are graphically illustrated by the curve in the accompanying drawing, wherein the K-values of the various copolymer products made and tested are also indicated.

Similar results are obtained with copolymers of VO–E and N-vinyl-2-piperidone, N-vinyl-2-caprolactam, N-vinyl-succinimide, N-vinyl-3-morpholinone, or mixtures thereof with one another or VP. Similar results are also obtained when solutions of different polymer solids concentration are involved.

*Example C*

A spinning solution comprised of about 10 parts of polyacrylonitrile dissolved in about 90 parts of a 60 percent aqueous solution of zinc chloride is extruded through a spinnerette having 750 orifices, each having a diameter of about 0.006 inch, into an aqueous coagulating bath that contains about 42 percent of zinc chloride dissolved therein to be spun into a multiple filament tow. The coagulated tow is washed substantially free from salt after being withdrawn from the coagulating bath and collected. There is thereby obtained an aquagel fiber containing about 2 parts of water for each part of polymer therein.

About 1.5 parts of the aquagel (on a wet weight basis) is immersed for about 20 minutes in an aqueous solution of about 3 percent of a VO–E/VP copolymer containing about a 25/75 respective weight ratio of each monomer in the polymer molecule. The applicating solution is maintained at about 95° C. during the impregnation without experiencing any occurrence of polymer clouding. The copolymer employed has a Fikentscher K-value of about 30 and is prepared as set forth in the first example. After being impregnated, the polyacrylonitrile fiber is removed from the impregnating bath and dried for 15 minutes at about 150° C. Its dye-receptivity when dyed in the conventional manner with 4 percent Calcodur Pink 2BL (C.I. 353) is found to be excellent, with the copolymer-containing fiber accepting the dyestuff to deep and level shades of coloration. Commensurate results are obtained when the adjuvant consists of any other of the VO–E copolymers of the invention.

*Example D*

Six percent beer was treated with about 0.005 percent of the VO–E/VP copolymer of Example C. Upon addition of the copolymer, a noticeable precipitation of pectins and other haze-inducing ingredients was observed. The beer was filtered and, upon subsequent chilling to about 0° C. for 24 hours followed by rewarming to room temperature, was found to be unafflicted with any chill-hazing effect.

Although the present invention has been described and is hereinafter claimed primarily in terms of copolymers of N-vinyl-5-ethyl-2-oxazolidinone, it is to be fully understood that equivalent results are obtained when the indicated varieties of copolymers of either N-vinyl-4-ethyl-2-oxazolidinone or N-vinyl-4,5-dimethyl-2-oxazolidinone, or mixtures thereof or of either or both isomers with N-vinyl-5-ethyl-2-oxazolidinone, are prepared and utilized as the VO–E copolymers contemplated herein. Hence, such obvious copolymeric equivalents are intended to be read upon and are deemed, as falling within the scope and purview of the hereto appended claims.

What is claimed is:

1. A normally solid copolymer consisting essentially of between about 1 and 99 weight percent, based on the weight of the copolymer, of copolymerized N-vinyl-5-ethyl-2-oxazolidinone with from about 99 and 1 weight percent, based on the weight of the copolymer, of a copolymerized monomer selected from the group consisting of N-vinyl-2-pyrrolidone, N-vinyl-2-piperidone, N-vinyl-2-caprolactam, N-vinyl-succinimide, N-vinyl-3-morpholinone, and their mixtures.

2. The copolymer of claim 1, containing from about 5 to 95 weight percent of said N-vinyl-5-ethyl-2-oxazolidinone.

3. A copolymer of N-vinyl-5-ethyl-2-oxazolidinone and N-vinyl-2-pyrrolidone according to claim 1.

4. The copolymer of claim 3, containing less than about 40 weight percent of said N-vinyl-5-ethyl-2-oxazolidinone.

5. The copolymer of claim 3, containing from about 1 to 30 weight percent of said N-vinyl-2-pyrrolidone.

6. The copolymer of claim 1 having a Fikentscher K-value between about 5 and 100.

References Cited in the file of this patent

UNITED STATES PATENTS 2,818,399   Drechsel _____ Dec. 31, 1957